Patented Aug. 5, 1947

2,425,029

UNITED STATES PATENT OFFICE 2,425,029

CHLORINE DERIVATIVES OF TRIMETHYL ACETONITRILE

Oliver W. Cass, Niagara Falls, N. Y., assignor to E. I. du Pont de Nemours & Company, Wilmington, Del., a corporation of Delaware No Drawing. Application March 2, 1945, Serial No. 580,701

4 Claims. (Cl. 260—464)

1

This invention relates to the production of certain new and unique chlorinated aliphatic compounds which have a high thermal stability and a high chemical reactivity with other compounds.

It is an object of this invention to produce chlorinated aliphatic compounds containing cyano groups, which compounds have a high thermal stability and in which both chlorine and cyano substituents have a high chemical reactivity.

It is another object of this invention to produce a series of new chlorinated nitriles which have a considerable value because of their thermal stability and of still further value as intermediates in chemical processes because of their high chemical reactivity.

It is a further object of this invention to provide suitable processes for the production of the above said new and unique compounds.

Other objects of the invention will appear hereinafter.

In accordance with this invention, the above objects are accomplished by reacting trimethyl acetonitrile:

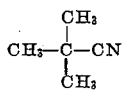

with chlorine; the amount of chlorine being adjusted to yield the particular chlorinated derivative desired.

The chlorinated derivatives obtainable in this manner may be represented by the following general formula.

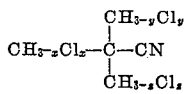

in which $x=1$ to 3 and $y$ and $z=0$ to 3.

All of the compounds represented by the above formula are novel and unique chemical compounds which have been found to possess highly valuable properties especially as chemical intermediates in the preparation of other chemical compounds of value in widely separated fields.

The chlorine derivatives of trimethyl acetonitrile are characterized by extraordinary thermal stability due to the fact that no hydrogen is available on the carbon atom adjacent to the carbon atom bearing the chlorine atom. It is, therefore, impossible to remove hydrogen chloride in the customary fashion by cracking out its elements from adjacent carbon atoms. It has

2 previously been known that chlorides of related structure such as neopentyl chloride:

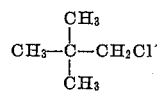

possess high thermal stability. However, neopentane, which forms a basis for the preparation of neopentyl chloride, is a relatively expensive and rare laboratory chemical, so that the industrial preparation of derivatives of neopentane is not feasible and to the best of my knowledge has never been carried out. In addition, the chlorine atom in neopentyl chloride is unusually inert chemically so that the use of this compound as an intermediate in chemical synthesis is not feasible. To illustrate the inertness of the chlorine atom in neopentyl chloride, it is only necessary to recite the fact that it is stable to alcoholic potassium hydroxide at 100° C. for 20 hours, and to cuprous cyanide at 90° C. for 200 hours.

It is, therefore, readily appreciated that my novel chemical derivatives which possess the high thermal stability of neopentyl chloride and yet possess high chemical reactivity not only of the chlorine atoms but also of the cyanide group find a high degree of usefulness in the field of synthetic organic chemistry. The fact that the substitution of a CN group for a $CH_3$ in neopentane would confer chemical reactivity upon the halogen atoms also present in the molecule without at the same time decreasing its thermal stability was completely unexpected and surprising.

Trimethyl acetonitrile may be advantageously prepared as disclosed in the copending patent application Serial No. 521,666, of C. R. Harris et al., filed Feb. 9, 1944. The chlorination of trimethyl acetonitrile is preferably carried out by passing chlorine gas into trimethyl acetonitrile at a temperature of between 70° C. and 165° C. in the presence of actinic radiation which may be provided by a light source, for example, a tungsten filament light bulb, a carbon arc light, a mercury vapor light or the like. The chlorine is passed into the trimethyl acetonitrile until the total weight of chlorine to total weight of the acetonitrile corresponds with the molecular proportion of chlorine to acetonitrile necessary to produce the desired chlorination product. The desired chlorination product is then separated from other chlorination products which may be present. This may, for example, be done by fractional distillation.

The following detailed examples are given to illustrate certain preferred methods of producing chlorine derivatives of trimethyl acetonitrile. It is to be understood, however, that the details set forth in these examples are not to be taken as limitative of the invention.

*Example I*

The chlorination of trimethyl acetonitrile is carried out in a glass lined reactor which is provided with a jacket for heating or cooling as desired, with an agitator, with an appropriate inlet line through which chlorine may be introduced, with a thermocouple well, with a reflux condenser leading to an absorption system for the absorption of the hydrogen chloride evolved during the reaction, and with a series of glass wells into which sources of light may be inserted. Into such a reactor was charged 2755 parts of trimethyl acetonitrile. The contents of the reactor was heated with stirring to a temperature of 95° C. The sources of light in the light wells, which in this case consisted of 200 watt tungsten filament bulbs, were turned on. Chlorine was then admitted through the chlorine inlet line. After a short induction period, during which time the chlorine dissolved in the trimethyl acetonitrile, chlorination began as was indicated by a marked rise in temperature followed by the evolution of hydrogen chloride gas. Cooling was then applied to the jacket of the reactor and contents of the reactor were held at 95° C. until a total of 2470 parts of chlorine had been introduced and reacted. This was equivalent to the reaction of 1 mol of chlorine with each mole of trimethyl acetonitrile. During this time, the scrubbing system gained in weight 1269 parts, practically all of which was evolved hydrogen chloride.

The contents of the reactor were then transferred to a still equipped with a fractionation column. There was secured by fractionation 540 parts of unreacted trimethyl acetonitrile, followed by a fraction consisting of 2535 parts of monochlor trimethyl acetonitrile. There remained behind in the distillation kettle a total of 760 parts di and tri chloro trimethyl acetonitrile. This residue could be further fractionated if desired, to secure these additional values. The yield of mono chlor acetonitrile based upon unrecovered trimethyl acetonitrile was 84%. Monochlor trimethyl acetonitrile is a colorless pleasant smelling liquid boiling sharply at 175° C. at 745 mm. pressure, freezing and melting sharply at 15° C., with a density of 1.029 at 20° C., and a refractive index of 1.4360 at 20° C. The high reactivity of both the chlorine and cyanide groups is indicated by the ready saponification of both groups with aqueous caustic to form the sodium salt of hydroxy trimethyl acetic acid and by vigorous reaction with alcoholic sodium sulfide to form bis (cyano methyl propyl) sulfide:

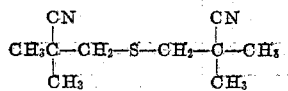

By varying the ratio between the added chlorine and the trimethyl acetonitrile, it is possible to secure high yields of the monochloride or of the higher chlorinated derivatives as is desired. In order to demonstrate the preparation of dichlor trimethyl acetonitrile, the following example may be given:

*Example II*

830 parts trimethyl acetonitrile was placed in a reactor similar to the one used in Example I above. Chlorination was started in exactly the same way and carried out as in Example I above until approximately 2 moles of chlorine has been introduced for each mole trimethyl acetonitrile. In all, 1420 parts of chlorine was added. During the chlorination, the scrubbing system absorbed 740 parts of hydrogen chloride. Upon fractionation of the reaction product as in Example I above, three fractions were secured. The first fraction consisted of 130 parts monochlor trimethyl acetonitrile. The second fraction consisted of 1140 parts dichlor trimethyl acetonitrile which distilled between 200 and 210° C. The third fraction consisted of 220 parts higher boiling material, primarily trichlor trimethyl acetonitrile. The 1140 parts dichlor trimethyl acetonitrile are equivalent to approximately a 75% yield based on the original trimethyl acetonitrile.

As can be visualized by an inspection of formulae, two possible dichlor trimethyl acetonitriles are formed. One of these materials is a white solid which is most readily secured by simply chilling the dichloride fraction of boiling point of 200–210° C. and filtering off the crystals formed. The solid dichlor isomer secured in this fashion melts sharply at 69–70° C. and distills without decomposition at 207–208° C. The chlorine content of these crystals was determined to be 45.5% compared to a theoretical 46.2% for dichlor trimethyl acetonitrile. The filtrate from which the solid isomer has been separated consists of the eutectic between the solid isomer and the liquid isomer. The boiling range of this liquid fraction of dichloride isomer will ordinarily be 200–205° C.

From the 1140 parts dichlor trimethyl acetonitrile prepared as above, there was secured 510 parts of solid dichlor isomer and 630 parts of the liquid mixture of dichlor isomers.

In order to secure more highly chlorinated derivatives of trimethyl acetonitrile, it is necessary to go to higher reaction temperatures. This is illustrated by the following example:

*Example III*

390 parts trimethyl acetonitrile was placed in a reactor similar to the one used in Example I above. Chlorination was started in exactly the same way and carried out as in Examples I and II above until 1.5 moles of chlorine had been introduced for each mole of trimethyl acetonitrile present. The temperature was then raised to 150° C. Chlorine was passed into this hot solution until a total of 1540 parts of chlorine had been absorbed. During this period, a total of 778 parts of hydrogen chloride was absorbed by the scrubbing system. The practically colorless product was then fractionally distilled, 97% boiling within the range 225–266° C., and consisting of a mixture of the tetrachlor and pentachlor trimethyl acetonitrile isomers. The density of this material was 1.490 at 25° C. The freezing point was below −20° C., the refractive index was 1.586 at 20° C. This very stable and non-flammable composition is suitable for use in such widely separated fields as chemical intermediates, electrical installations and heat transfer systems. By passing greater quantities of chlorine into the trimethyl acetonitrile it is possible to chlorinate the compound to complete substitution of chlorine for hydrogen, if so desired.

In the polychloro derivative of trimethyl acetonitrile both the chlorine and the cyanide groups retain a high degree of chemical reactivity, allowing the acid hydrolysis of the nitrile group to polychloro trimethyl acetic acid, or basic saponification to complex polyfunctional derivatives of the sodium salt.

Since it is obvious that many changes and modifications can be made in the above described details without departing from the nature and spirit of the invention, the invention is not to be limited by said details except as set forth in the appended claims.

I claim:
1. Monochlor trimethyl acetonitrile.
2. Dichlor trimethyl acetonitrile.
3. The mixture of tetrachlor- and pentachlortrimethyl acetonitrile boiling within the range 225° C.–266° C., and having a density of 1.490 at 25° C., a freezing point below —20° C., and a refractive index of 1.586 at 20° C.
4. As a new chemical compound, a chlorine derivative of trimethyl acetonitrile taken from the group consisting of monochlor trimethyl acetonitrile, dichlor trimethyl acetonitrile, and a mixture of tetrachlor and pentachlor trimethyl acetonitrile boiling within the range 225° C. to 266° C., and having a density of approximately 1.490 at 25° C., a freezing point below —20° C., and a refractive index of approximately 1.586 at 20° C.

OLIVER W. CASS.

REFERENCES CITED

The following references are of record in the file of this patent:

UNITED STATES PATENTS

| Number | Name | Date |
|---|---|---|
| 2,174,756 | Pieroh | Oct. 3, 1939 |
| 2,283,237 | Spence et al. | May 19, 1942 |

OTHER REFERENCES

Heilbron, "Dict. of Org. Compounds," (Oxford, 1938), vol. 3, p. 505.